United States Patent [19]

Blezard

[11] Patent Number: 4,997,330

[45] Date of Patent: Mar. 5, 1991

[54] ARTICLE HANDLING AND WEIGHING APPARATUS

[75] Inventor: Robert C. Blezard, North Smithfield, R.I. 02646

[73] Assignee: Charles Packaging Corporation, Lincoln, R.I.

[21] Appl. No.: 372,280

[22] Filed: Jun. 27, 1989

[51] Int. Cl.⁵ ............................................. B25J 9/02
[52] U.S. Cl. ...................................... 414/225; 74/68; 414/744.8; 414/21; 901/7; 901/6; 901/20
[58] Field of Search ............ 414/21, 225, 226, 744.2, 414/744.8; 901/6-8, 20; 74/51, 68; 294/116

[56] References Cited

U.S. PATENT DOCUMENTS

| 2,998,887 | 9/1961 | Sommer | 901/6 X |
|---|---|---|---|
| 3,306,471 | 2/1967 | Devol | 901/20 X |
| 3,368,414 | 2/1968 | Scholin et al. | 74/68 |
| 3,593,607 | 7/1971 | Munchbach | 74/68 X |
| 4,636,241 | 1/1987 | Nebelung | 294/116 X |
| 4,678,393 | 7/1987 | Mink | 901/7 X |
| 4,849,175 | 7/1989 | Dupain et al. | 901/8 X |

FOREIGN PATENT DOCUMENTS

| 176409 | 10/1953 | Austria | 74/68 |
|---|---|---|---|
| 3636602 | 6/1987 | Fed. Rep. of Germany | 414/225 |
| 0837855 | 6/1981 | U.S.S.R. | 294/116 |
| 1186465 | 10/1985 | U.S.S.R. | 294/116 |

Primary Examiner—David A. Bucci
Assistant Examiner—William M. Hienz
Attorney, Agent, or Firm—Edward D. C. Bartlett

[57] ABSTRACT

A transfer device for use in treating a work product is disclosed, in which a first gripper assembly rotates about a pivot point located between an input conveyor and a station, and a second gripper assembly rotates about a pivot point positioned between the station and an output conveyor. The rotation of each gripper assembly may be accelerated or decelerated at predetermined points in the rotation cycle by use of a cam, roller, and linkage mechanism.

14 Claims, 5 Drawing Sheets

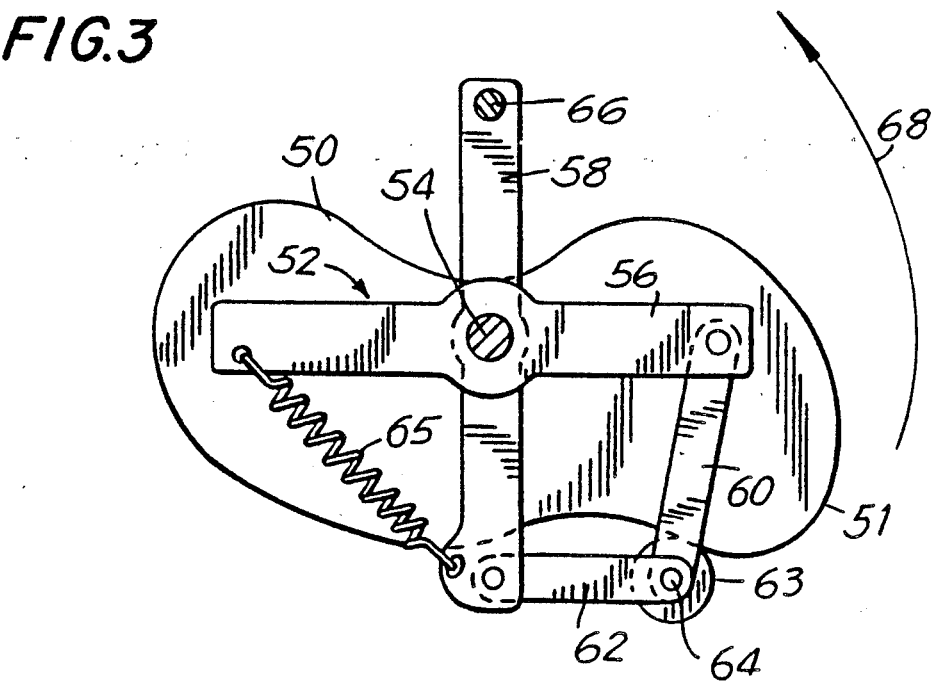
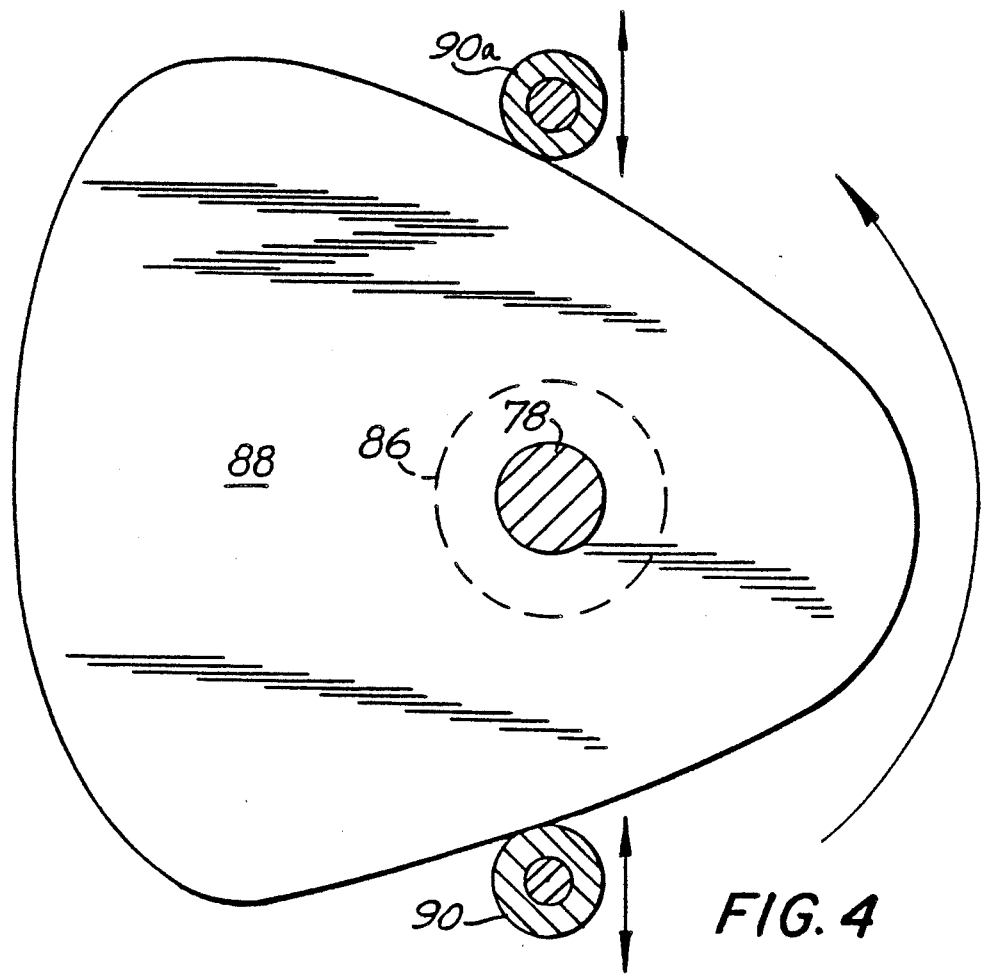

ARTICLE HANDLING AND WEIGHING APPARATUS

RELATED APPLICATIONS

Application Ser No. 126,541, filed November 30, 1987 and now U.S. Pat. No. 4,848,479 granted July 18, 1989 by Herbert Schaltegger and the present application are owned by the same assignee.

FIELD OF THE INVENTION

The invention relates to article handling and weighing apparatus and, more particularly, to apparatus for weighing containers while in transit during filling or other processing.

BACKGROUND OF THE INVENTION

It is desirable to weigh containers during filling and closure processing to determine that the correct amount of material has been placed in the container. The apparatus disclosed in Schaltegger U.S. Pat. No. 4,848,479 for checking the weight of filled containers is referred to as a "straight-line" checkweigher because it removes the container from a supply line and then deposits it on a delivery line which is parallel to the supply line. This is desirable for space conservation.

The checkweigher disclosed in Schaltegger has an excellent container transfer mechanism, a birfurcated robotic transfer guide for clasping and releasing the containers, but the epicycloidal motion of that guide, from pick-up to delivery, derives from the fact that it is driven by a planetary gear traveling around the (Pg. 10) periphery of its drive gear, a complex, expensive and space consuming mechanism.

Each transfer guide of the apparatus disclosed in Schaltegger provides a pair of concave container receiving and transferring elements of approximately equal arcuate extension; one stabilized relative to a shaft extending from a planetary gear and one pivoted relative to the shaft to close about and open to release the processed container. Such a construction eliminates the need for guide rails, but requires additional peripheral operating room to accommodate the epicycloidal movement of the transfer guides and the planetary action of their gear actuators.

Furthermore, because of the space requirements for the gearing and planetary travel of the guides, the weigh station must be located out of the operative field of the gear mechanisms, thus resulting in machinery having relatively large floor dimensions. This is never totally acceptable to container processors for reasons of economy, as well as the desire to have the containers processed quickly through as small a processing area as possible.

Checkweighing apparatus and other container processing apparatus weigh stations are necessarily adjacent or surrounded by very fast moving drive and guide mechanisms which cause vibration within the apparatus and inaccuracy in the weighing readout. Close tolerance machining and counter moving drives may minimize vibration but at excessive costs and not sufficiently to guarantee weighing accuracy within desirable parameters.

The objects of the present invention include the provision of container processing apparatus with simplified driving and guiding trains facilitating very fast processing, particularly weighing, of containers with high accuracy and the provision of such apparatus using minimal floor space.

BRIEF DESCRIPTION OF THE DRAWINGS

FIG. 3 is a detail in plan view showing the lost motion drive for the bifurcated gripping means.

FIG. 4 is a detail in plan view showing the cam operating the thumbs of the bifurcated gripping means of one of the pinwheels.

DETAILED DESCRIPTION OF THE DRAWINGS

Figure 1:
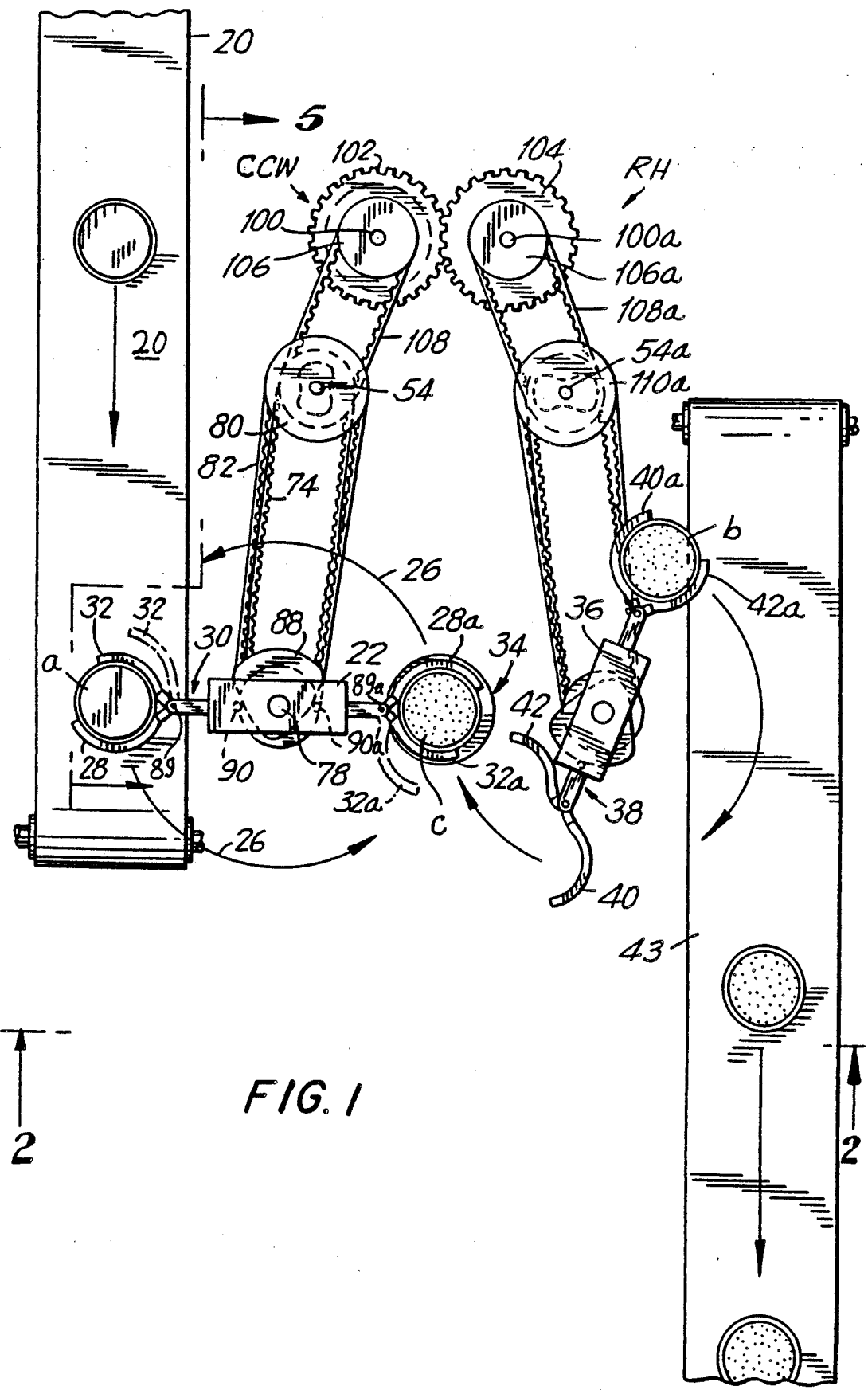
FIG. 1 is a plan view showing input and discharge conveyors and weighing station with one of the bifurcated gripper mechanisms in a stationary container receiving position.

Referring now to FIG. 1 of the drawing, an input conveyor 20 is shown with one container a at a pick-up position. The bifurcated gripper means pinwheel 22 rotates with shaft 78 in the counter-clockwise direction indicated by the arrow 26. As will be later explained, the basic or initial drive means of the pinwheel 22 has a constant angular velocity, however, a novel drive train produces a lost motion to arrest or substantially slow the rotary motion of pinwheel 22 at the position shown in FIGS. 1, 6, 7 and 10 so that the container a comes to rest against the hand 28 of bifurcated gripping means 30. During this lost motion period the thumb 32 closes upon the container a as the bifurcated gripper means 30 accelerates to regain its angular position in the cycle following its arrested or impeded motion.

This lost motion produces deceleration and then acceleration to regain the loss. It occurs each 180° of rotation of the pinwheel(s) 22 (36). Thus, the opposing hand 28a is arrested or greatly slowed in its motion at the weighing/filling station 34 while its thumb 32a opens to release the container on the weighing station 34. The pinwheel 36 is similarly operated but in rotation of the opposite hand and averages 90° out of phase with the pinwheel 22. Pinwheel 36 with its associate bifurcated gripping means 38 having the hand 40 and the thumb 42 transfers a container on the station 34 to the discharge conveyor 43.

It will be seen that the lost motion or stationary dwell of the pinwheels 22 and 36 produce several important and beneficial effects:

1. a container, such as a (FIG. 1) nestles in the hand 28 while the thumb 32 closes upon it;

2. a container b (FIG. 1) moves away from the hand 40a with discharge conveyor 43 while the thumb 42a moves away from the container b.

3. A container c may be held, vibrated and released at the weighing and loading station 34. Vibration compacts comminuted materials.

Before detailing the operative drive train and cams that produce the lost motion of the pinwheels 22 and 36, and the rotating cams that open and close the thumbs 32, 32a, 42 and 42a even while their respective pinwheel is in a lost motion stationary position, reference is made to FIGS. 6 through 10 illustrating diagramatically the relative rotary motion of the pinwheels 22 and 36 and the relative motion of the thumbs 32, 32a, 42 and 42a.

Figure 6:
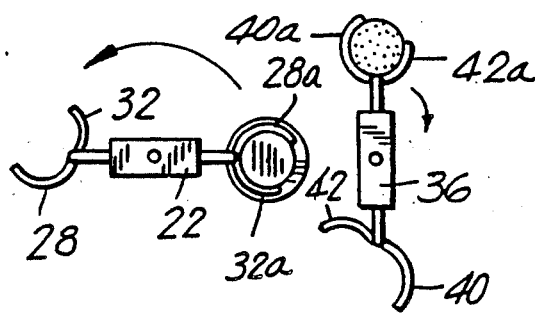
FIGS. 6 through 10 show schematically a 180° cycle of the bifurcated gripping means illustrating the lost motion or variable velocity and the position of the gripper thumb throughout the cycle.

FIGS. 6 through 10 have been captioned 0°, 20°, 90°, 110° and 180° respectively. The 0° position FIG. 6 shows the beginning of the lost motion stationary position of the pin wheel 22, 90° out of phase with the pin wheel 36. In my preferred embodiment the pinwheel is indeed stationary for some 20° of rotation of its drive shaft. Modifications permitting some motion are, of course, possible and within the spirit of my invention. This may, for example, be done by modifying the track of cam 50 shown in FIG. 3. Thumbs 32 and 42 are open and thumb 32a and 42a are in closed container gripping position.

Figure 7:
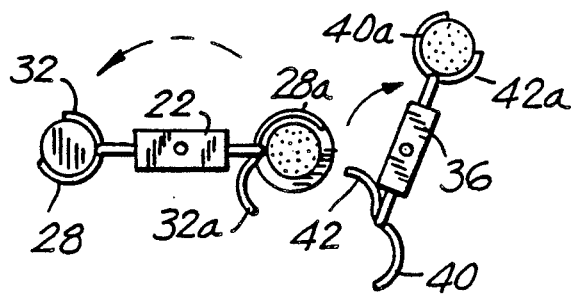

The 20° position FIG. 7 shows the position of the pinwheel 22 at the end of its lost motion stationary dwell (zero velocity) with the thumb 32 now moved into the closed position. It will be observed that the pinwheel 36 has rotated 20°. The dotted arrow indicates non-movement (or very slow movement) of the pinwheel 22 even though its primary drive shaft 54 rotates. Thumb 32a opens. Thumbs 42 and 42a remain respectively open and closed.

Figure 8:
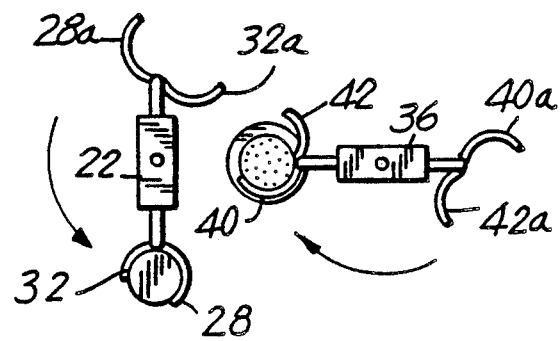

The 90° position FIG. 8 shows the relative position of the two pinwheels after 90° of average or mean movement, i.e. 90° rotation of its primary drive shafts 54, 54a. Pinwheel 22 has regained its lost motion passage and is again 90° out of phase with pinwheel 36. Pinwheel 36 is initiating its lost motion and its thumb 42 is in the open position and commencing to close. Thumbs 32 and 32a remain respectively closed and open. Thumbs 42 and 42a are unchanged but commencing to move.

Figure 9:
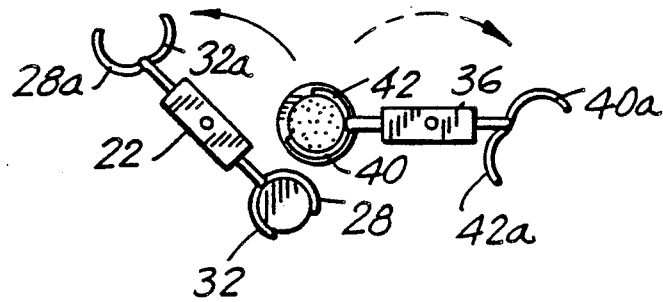

The 110° FIG. 9 is 20° later in the cycle than FIG. 8. The pinwheel 22 has moved 20° from its position in FIG. 8 and its thumb 32 remains in closed position and 32a in open position. During this 20° rotation, the pinwheel 36 remains in the same position illustrated in FIG. 8 going through its 20° lost motion (zero velocity) stationary dwell. The dotted arrows in FIGS. 7 and 9 indicate that the primary drive mechanism has advanced 20° while one pinwheel 36 remains stationary. The thumb 42 closes while 42a opens.

Figure 10:
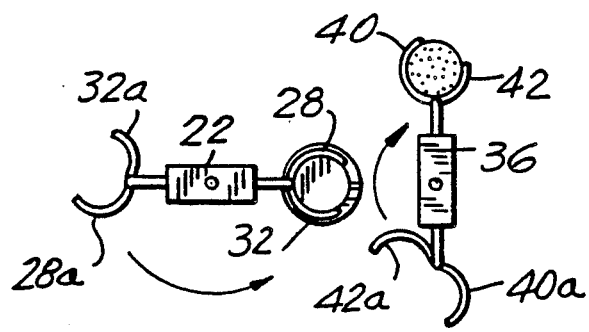

The 180° position FIG. 10 shows a position 70° after FIG. 9 and the pinwheel 36 has regained its rotative position at 90° out of phase with pinwheel 22. Its thumbs 42 and 42a remain respectively closed and open. Thumbs 32 and 32a remain unchanged but will begin to open and close respectively in the next 20° of rotation.

It will be observed that FIG. 10 appears the same as FIG. 6 The difference is that both pinwheels have rotated 180° so that, for example, the hand 28a appears to the left and the hand 28 appears to the right in FIG. 10. Similarly, the hands 40 and 40a of pinwheel 36 are reversed from FIG. 6. The final 180° of a 360° cycle would appear the same during the return of the hands 28a and 28 (40a and 40) to the position in FIG. 6.

In FIG. 3 is shown the stationary cam 50 and driven mechanism 52 that in turn drives the pinwheel 22. It will be understood that a similar device of the opposite hand operates the pinwheel 36. The lever 56 is keyed to the drive shaft 54 rotating at a constant angular velocity. Lever 58 is rotatably mounted on the shaft 54, one end of lever 58 has pivoted thereon the link 62 whose other end is pivotally attached to the link 60 by a stub shaft 64 bearing a cam follower 63 in contact with cam track 51 of cam 50. The other end of link 60 is pivoted to an end of lever 56. Spring 65 tends to pull the lever 58 clockwise toward the free end of the lever 56. The free end of lever 58 carries a vertical pin 66 drivingly engaging a pulley 72 rotatable about and concentric with shaft 54. The pulley drives the pinwheel 22 through belt 74, pulley 76 and shaft 78 and thereby imparts the lost motion controlled by cam 50 acting through links 62 and 60 by means of cam track 51 and cam follower 63.

It will be seen that as the cam follower on the stub shaft 64 moves to a lesser radius of the stationary cam 50, the lever 58 will be moved clockwise relative to the counter-clockwise rotation of lever 56 indicated by the arrow 68 (which is the direction of rotation of the shaft 54). This relative clockwise rotation actually arrests the motion of the lever 58 causing it to loiter or linger for the period of time or degrees of cycle that the cam follower is dropping from a larger radius to a smaller radius of the cam track 51. As the radius thereafter increases the lever 58 is moved counter-clockwise relative to the lever 56 and thereby recovers the lost motion and is back in rotary sync with the shaft 54. The pulley 72 driven by the pin 66 is the beneficiary of this lost and regained motion and it is the drive pulley for timer belt 74, pulley 76, and shaft 78 of pinwheel 22. A similar drive (not shown) operates pulley 76a and shaft 78a of pinwheel 36.

Figure 5:
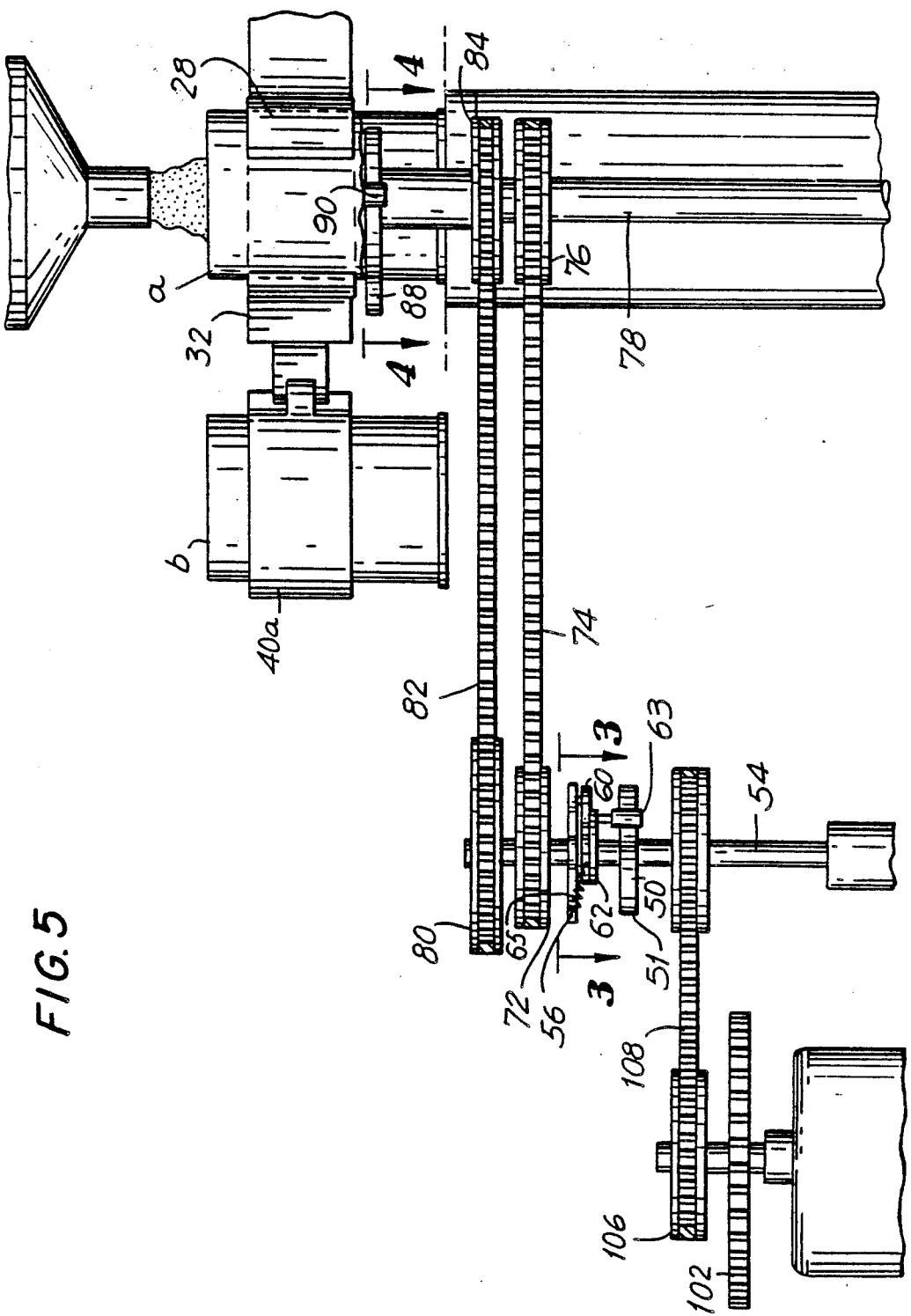
FIG. 5 is an elevation taken on line 5—5 of FIG. 1.

Referring to FIGS. 1, 4 and 5, pulley 80 keyed to the shaft 54 drives timing belt 82 driving pulley 84 mounted to a collar 86 revalubly mounted on the shaft 78. The collar 86 has secured to it a cam 88 rotating in the same direction as the shaft 78 but exactly twice the angular velocity. The speed change (2:1) is achieved through the 2:1 ratio between the pulleys 80 and 84. The thumbs 32 and 32a on pivots 89, 89a, respectively, carry cam followers 90 and 90a respectively, via conventional linkage, not shown, the followers engaging the cam 88 also by conventional means which opens and closes the thumbs as the radius of the cam decreases and increases respectively as clearly shown in FIG. 4.

Referring specifically to FIG. 4, the cam 88 is shaped to have a relatively short thumbs open dwell and a relatively longer and oppositely facing closed dwell. In the direction of rotation, the slope between these dwells is such as to move the thumbs during the lost motion loiter of the pinwheel. I found that I could not use a stationary cam 88 because of this loiter but by having a cam co-rotating at twice the speed of the pinwheel, the thumbs could be closed or opened as the case might be during the loiter. The angular distance of the opening and closing slopes of the cam corresponds to approximately twice the angular period of the loiter of the pinwheel. A similar and counter-rotating device is used to operate thumbs 42, 42a of pinwheel 36.

Figure 2:
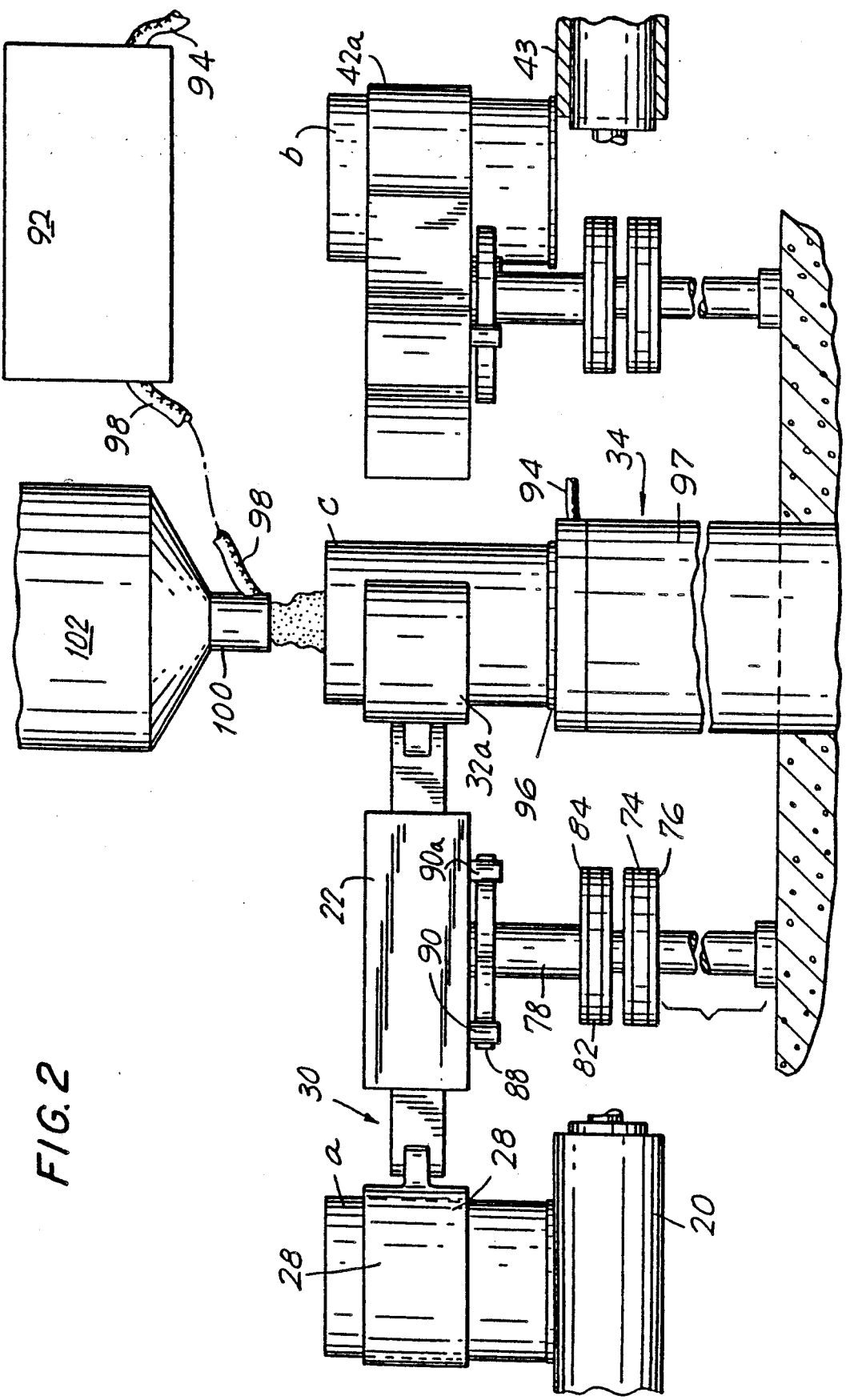
FIG. 2 is an elevation taken on the line 2—2 of FIG. 1 and showing the filling mechanism at the weighing station.

Referring to FIG. 2, there is shown the program computer 92 receiving impulses from the input cable 94 which is the output of the weighing device 96 at station 34. Output cable 98 of the computer 92 controls the feed from the nozzle 100 of feed reservoir 102. Reservoir feed mechanism 100, 102 can be any of the many types well known in the art but preferably should have state of the art accuracy. The same is true of weighing mechanism 96. Accuracy is greatly enhanced by the motion dwell at station 34, which allows time for multiple weighings by modern weighing devices whose period is measured in microseconds. This substantially reduces error and thereby allows a smaller programmed overfill while meeting weight accuracy requirements. It should be noted that the post 97 is embedded, preferably in the ground or the floor of the building to avoid vibration created by the moving machinery. That is, the weighing platform 96 is sequestered from the driving, moving and conveying parts of the machine to eliminate the vibration inherent in those parts. Where a vibration is desired as to compact, comminuted material, a vibrator may be attached to the post 97 or weighing device 96 for vibration during an interim between sequential weighings.

It should be noted that the discharge conveyor is preferably parallel the input conveyor. However, certain adaptations might desirably turn the discharge conveyor to another direction away from the input conveyor within the spirit of the invention so long as the discharge pinwheel 36 can release its load on the discharge conveyor.

Referring to FIG. 1, the drive shaft 100 drives gear 102 which in turn drives gear 104 in the direction of the opposite hand. Shaft 100 also drives pulley 106 driving timing belt 108 driving pulley 110 which drives the driven shaft 54. Gear 104 is keyed to shaft 100a driving pulley 106a driving timing belt 108a driving pulley 110aand rotating the shaft 54a. The reverse hand mechanism indicated by the arrow at RH operates in the manner described with respect to the counter-clockwise CCW as viewed in FIG. 1 mechanism already described. The RH mechanism is of course 90° out of phase with the CCW mechanism.

I claim:

1. In a transfer device for treating a work product,
an input conveyor,
an output conveyor,
a station positioned between said conveyors,
first gripper means rotating about a pivot point located between said input conveyor and said station,
second gripper means rotating-about a pivot point positioned between said station and said output conveyor,
means to drive said first and second gripper means at a predetermined angular velocity in synchronization with each other for sequential arrival at said station, said drive means capable of angularly decelerating at least one of said gripper means to a velocity below said predetermined velocity as said at least one gripper means arrives at said station, said drive means further capable of angularly accelerating said at least one gripper means to recover the lost angular velocity thereof and to restore the predetermined angular velocity,
wherein said drive means comprises a shaft driven at a given angular velocity, a first device fixed on said shaft having a portion displaced radially from the axis of said shaft to rotate with said shaft, a second device rotatably mounted about said shaft and having a portion displaced from the axis of said shaft, and a flexible member attached to and linking said portions, wherein during rotation of said shaft said member may shorten, thereby reducing the angular distance between the portions, and said member may be lengthened, thereby increasing the angular distance between the portions, whereby said first device causes said second device to rotate therewith and the second device is angularly accelerated or decelerated during the change of length of the member, to cause the acceleration or deceleration of said at least one gripper means.

2. A device as set forth in claim 1 wherein said station is a product treatment station.

3. A device as set forth in claim 1 wherein said station is a weighing station.

4. A device as set forth in claim 1 wherein said station is a filling station.

5. A device as set forth in claim 1 wherein said station is a weighing and filling station.

6. The device of claim 1 wherein at least one of said gripper means has contact means to open and close said at least one gripper means and a cam rotating about the pivot point of said at least one gripper means at an angular velocity which is at least twice said predetermined velocity, said cam during its rotation engaging said contact means to open and close said at least one gripper means at any selected angular velocity of said at least one gripper means, including zero angular velocity.

7. The device of claim 1 wherein at least one of said gripper means comprises means to move said at least one gripper means to at least one of an opened and closed position, and a cam rotating about an axis coaxial with the axis of rotation of said at least one gripper means at an angular velocity greater than said predetermined angular velocity, wherein said cam during its rotation engages said moving means.

8. In a transfer device for treating a work product,
an input conveyor,
an output conveyor,
a station positioned between said conveyors,
first gripper means rotating about a pivot point located between said input conveyor and said station,
second gripper means rotating about a pivot point positioned between said station and said output conveyor,
means to drive said first and second gripper means at a predetermined angular velocity in synchronization with each other for sequential arrival at said station, said drive means capable of angularly decelerating at least one of said gripper means to a velocity below said predetermined velocity as said at least one gripper means arrives at said station, said drive means further capable of angularly accelerating said at least one gripper means to recover the lost angular velocity thereof and to restore the predetermined angular velocity,
wherein said drive means comprises a shaft driven at a given angular velocity, a first lever secured to and substantially normal to said shaft to rotate with said shaft, a second lever rotatably mounted about said shaft, a linkage comprising a pair of links linked to each other and respectively to free portions of said levers, wherein during rotation of said first lever said linkage may be bent to shorten the angular distance between said levers, and may be straightened to increase the angular distance between said levers, whereby said first lever causes said second lever to rotate therewith, the second lever is angularly accelerated during bending of the linkage, and the second lever is angularly decelerated during the straightening of the linkage, to cause the acceleration and deceleration of said at least one gripper means.

9. A device as set forth in claim 8 wherein said station is a product treatment station.

10. A device as set forth in claim 8 wherein said station is a weighing station.

11. A device as set forth in claim 8 wherein said station is a filling station.

12. A device as set forth in claim 8 wherein said station is a weighing and filling station.

13. A device of claim 8 wherein at least one of said gripper means has contact means to open and close said at least one gripper means and a cam rotating about the pivot point of said at least one gripper means at an angular velocity which is at least twice said predetermined velocity, said cam during its rotation engaging said contact means to open and close said at least one gripper means at any selected angular velocity of said at least one gripper means, including zero angular velocity.

14. The device of claim 8 wherein at least one of said gripper means comprises means to move said at least one said gripper means to at least one of an opened and closed position, and a cam rotating about an axis coaxial with the axis of rotation of said at least one gripper means at an angular velocity greater than said predetermined angular velocity, wherein said cam during its rotation engages said moving means.

* * * * *